Nov. 13, 1962 D. A. NEWMAN 3,064,111
PLASTIC CUTTING DEVICE
Filed June 27, 1960
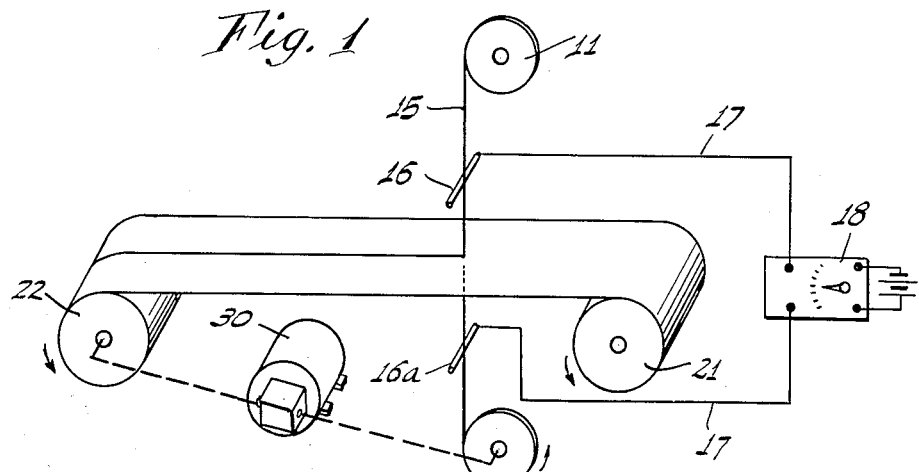
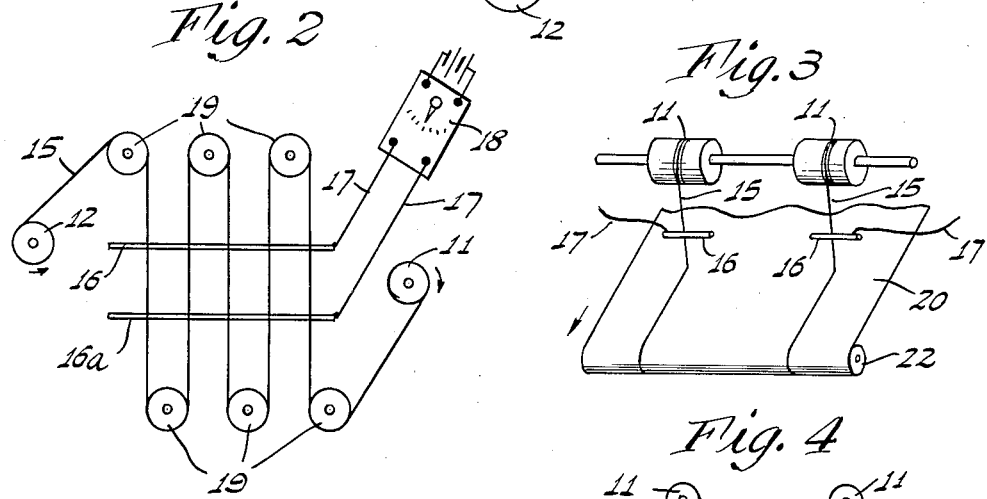
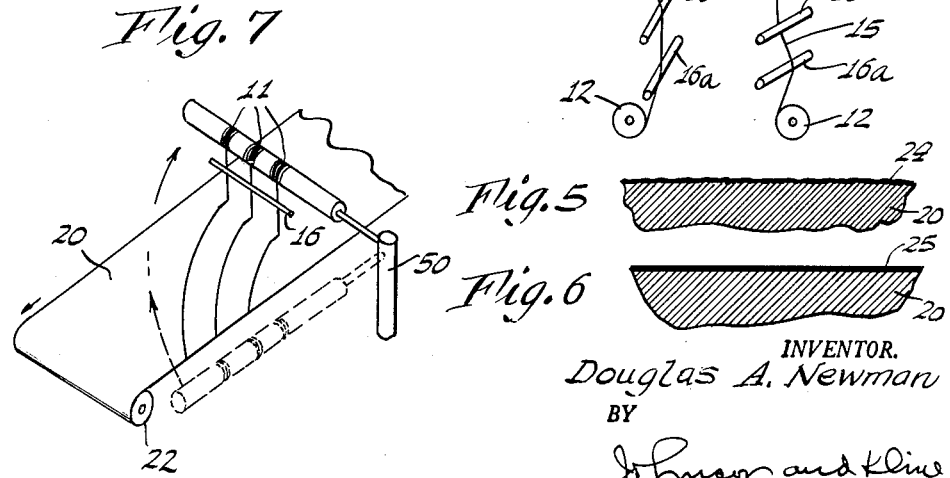
INVENTOR.
Douglas A. Newman
BY
Johnson and Kline
ATTORNEYS

United States Patent Office 3,064,111
Patented Nov. 13, 1962

3,064,111
PLASTIC CUTTING DEVICE
Douglas A. Newman, Glen Cove, N.Y., assignor to Columbia Ribbon and Carbon Manufacturing Co., Inc., Glen Cove, N.Y., a corporation of New York
Filed June 27, 1960, Ser. No. 38,892
7 Claims. (Cl. 219—19)

This invention relates to a novel apparatus for cutting wide webs of plastic film into narrow strips or ribbons while at the same time fusing and sealing the cut edges. More particularly the invention relates to the use of a moving heated wire in cutting plastic foundation typewriter ribbons from wide sheets.

It is known to cut plastic strips or ribbons from wide webs or sheets through the use of blades or heated wires. The use of blades has not proven satisfactory in that the cut edges of the plastic ribbon are sometimes uneven and retain plastic shavings or whiskers. This is due in part to the blade edge and the resistance which it offers to the traveling plastic sheet.

The use of heated wires has proven somewhat more effective in that a hot wire offers very little resistance to plastic material and, while cutting the material into strips or ribbons, the hot wire also serves to fuse the cut edges thereof. However, the main disadvantage encountered with the use of stationary heated wires is that it is very difficult, if not impossible, to maintain a constant uniform temperature at the severing portion of the wire. For instance, where a heated wire is maintained in a stationary vertical position and the plastic sheet is horizontally moved against the wire, the portion of the wire which makes contact with the plastic sheet becomes cooled thereby, particularly when the sheet is in relatively fast motion. As a result the cut edges become more uneven and ragged as the wire becomes cooler.

It has been proposed to use a continuous wire loop of heated wire to sever thermoplastic sheets. However, this has given rise to many problems. A loop of heated wire expands or contracts depending upon its temperature. Thus, unless special apparatus is used, the wire loop will slip on its pulleys when hot or break when it cools. To compensate for this expansion and contraction, a take-up mechanism must be used which tends to weaken the wire by constant stretching. Likewise the repeated heating and cooling of the limited amount of wire in the loop materially reduces its effective life. Another critical disadvantage of using continuous wire loops is that such loops are made by joining the ends of a wire strand. At this juncture the wire has a somewhat different diameter than the rest of the wire, no matter how skillfully it is joined. This irregularity, no matter how slight, is detrimental to effective slitting, particularly of typewriter ribbons which must have exceptional dimensional accuracy. The strength of the ribbon depends in great part upon the ribbon edges being even. Even small irregularities on the ribbon edge give rise to weakened spots that may break in use.

Furthermore, such heated loops do not provide uniform constant temperatures at the severing point since the length of wire to be heated necessarily results in much heat dissipation into the atmosphere as well as into the pulleys on which the wire must be mounted. A further disadvantage is that the placing of two contacts onto a continuous wire loop results in the creation of two distinct circuits, the temperature of each of which differs depending upon the relative length of the circuit. This temperature differential thus results in heat dissipation within the wire itself with resultant loss of uniform temperatures and tensions at the severing point.

The problem of having a constant uniform temperature at the severing point of the wire is particularly important in the case of cutting typewriter ribbons from wide sheets of plastic material carrying a suitable transfer layer such as a waxed-based imaging layer or the like. Where the temperature varies, the plastic sheet and the wax transfer material tend to sever unevenly and cling to the wire. Thus the cutting ability of the wire is poor as it passes through the plastic foundation and it leaves ragged edges and whiskers or strings thereon. The overall effect is that the cut edge of the ribbon is somewhat ragged and has a bead or an area of heavy concentration along the ribbon edge so that the ribbon is weak and cannot be evenly rolled on a spool without telescoping and crimping or building up at the ribbon edge. Uneven tension causes variation in the ribbon width and spooling.

It is therefore an object of the present invention to provide an apparatus for sharply severing plastic materials and cleanly fusing the cut edges thereof in a more efficient and reliable manner than heretofore possible.

It is another object of this invention to provide a plastic cutting apparatus employing one or more strands of moving heated wire having a uniform constant temperature at the severing point thereof.

It is a further object of this invention to provide a novel apparatus for cutting wide webs of plastic foundation transfer sheets into typewriter ribbons having exceedingly strong, clean, sharp and straight edges.

These and other objects are accomplished according to the present invention as more fully set forth hereinafter.

In the drawing:

FIGURE 1 represents a schematic side view, on a small scale, of the present apparatus in operation.

FIG. 2 represents a schematic front view, on a small scale, of the present apparatus with a single wire zigzagged over a plurality of idler rollers to provide a plurality of severing edges.

FIG. 3 represents a schematic front view of the present apparatus with a plurality of severing wires.

FIG. 4 represents a magnified view of two different methods by which the wire may make contact with contacts 16 and 16a to become part of the circuit.

FIG. 5 represents a diagrammatic cross-section, to an enlarged scale, of a typewriter ribbon cut with the use of a continuous heated wire loop.

FIG. 6 represents a diagrammatic cross-section, to an enlarged scale, of a typewriter ribbon cut with the present apparatus.

FIG. 7 is a schematic top view of the severing apparatus of the present invention supported on a pivot so that it may conveniently be brought into severing position.

As shown by FIG. 1 of the drawing, the thermoplastic material 20 is unwound on a horizontal plane from roll 21, passes through the cutting wire 15 and is then wound on roll 22 which consists of two separable spools. The number of spools of course is dependent upon the number of strips or ribbons which are cut. The cutting wire 15 consists of any of the well-known resistance metals, preferably Nichrome wire, and is preferably round in cross-section having a diameter of between about 0.5 to 1.5 mm., although the use of square, triangular or other shapes is contemplated. The wire is unwound from spool 11, passes over contact 16, through the thermoplastic material, over contact 16a and is wound on spool 12. Contacts 16 and 16a are joined by leads 17 to a variable current source 18 to form a circuit. Thus, when current is applied, the stretch of wire 15 between contacts 16 and 16a becomes heated to the desired temperature by varying the amount of current at control 18. In general, a voltage of between about 4 to 10 is applied. The distance between contacts 16 and 16a may be decreased as much as may be desired to provide greater uniformity of heating. It is preferred that they be separated by not more than about six inches, although greater distances may be set if desired.

Roller 22 and spool 12 are power driven by a variable speed motor 30 so that the plastic film is in constant horizontal motion while the wire is in constant vertical motion. When all of the wire has unwound from spool 11 onto spool 12, then one of two courses may be taken. The motor may be attached to spool 11 so that the wire begins to travel in reverse from spool 12 to spool 11, or else the spools may be disconnected and interchanged so that spool 12 is in the position formerly occupied by spool 11 and vice versa. Of course, due to the extreme thinness of the wire, enough of it may be wound on spool 11 so that it will last for very long periods of time without the necessity of rewind.

The angle at which the wire makes contact with the plastic film may be varied depending upon the nature of the material to be cut, and whether it carries a coating. FIG. 1 depicts the wire meeting the plastic at approximately at 90° right angle. However, in some instances it is preferred that spool 11 be positioned somewhat closer to roll 21 so that the angle is decreased to about 70°–75°.

Thus, as is evident, the operation of the apparatus of FIG. 1 is not complicated. Only one circuit is created and it consists of the variable current source 18, leads 17, conducting contacts 16 and 16a and the portion of wire 15 between the contacts. Since only a small part of the wire is heated at a time, the heat dissipation or loss is negligible and the amount of current required is very small. Likewise this allows for more uniform and accurate heat control with resultant sharp and clean cutting of the plastic film.

Where it is desired to simultaneously sever a number of ribbons from a wide sheet of plastic material through the use of a single wire, then the wire may be zigzagged over any number of idler rollers to provide as many cutting edges as necessary in the manner shown by FIG. 2 of the drawing. Thus the wire is removed from spool 11 and passes over idler roller 19, contact 16a, contact 16 and another idler roller 19 to provide one severing wire. The wire then passes back over contact 16, contact 16a and another idler roller to provide a second severing wire and so on. FIG. 2 depicts the use of a single contact 16 and a single contact 16a shared by each of the severing wires. However, if desired for more even heating, each severing wire may be furnished with its own contacts independent of one another as shown by FIG. 3.

FIG. 3 shows another embodiment of the present invention whereby a multiplicity of severing wires are employed to sever a multiplicity of ribbons, rather than a single zigzagged ribbon as shown by FIG. 2. In FIG. 3 the contacts 16 and 16a (not shown) are independent for each wire although all of the severing wires may share the same contacts, if desired, as shown by FIG. 2.

As shown by FIG. 4, wire 15 becomes part of the circuit either by placing the spools 11 and 12 slightly behind the contacts 16 and 16a so that the wire is moved across the contacts, or else the spools may be located on the same vertical plane as the contacts and the wire placed under contact 16 and over contact 16a to insure constant contact. Also, as will be clear to those skilled in the art, the contacts 16 and 16a may preferably be provided with a hole, a groove or a small grooved wheel at the point of contact with wire 15 in order to guide the wire in the same position at all times.

FIG. 5 of the drawing shows a magnified view of a typewriter ribbon cut by means of a continuous loop of heated wire. Due to the non-uniformity of temperature control, the cut edge is not sharp and carries whiskers. Also the fused plastic and wax transfer material are deposited along the ribbon edge in the form of a bead 24 or area of increased thickness. This makes the ribbon difficult to roll on a spool since the edge is thicker than the body of the ribbon. Thus the rolled ribbon tends to telescope and crimp and the carbon-wax coating thereon tends to crack and flake off the plastic foundation.

FIG. 6 shows a magnified ribbon cut by means of the present apparatus. The uniform heating of the cutting wire results in a sharp, clean cut edge. Likewise no bead of deposited transfer material is left on the ribbon edge, but rather there remains an extremely narrow margin of uncoated clear plastic foundation 25.

Another variation as shown by FIG. 7 involves supporting the wires and contacts on a pivot so that the wires may be brought into cutting position by slowly arcing the hinged wires into the edge of the plastic sheet without the necessity of stopping the traveling plastic sheet and feeding the sheet through the wires manually. As shown by the drawing, the severing apparatus is mounted on a hinge or other pivoting means so that it may be slowly arced across the plastic sheet and into position for severing. As the plastic sheet is rolled on roll 22, its continuity is never broken and the loose rounded cut edges of the ribbon are also wound on roll 22.

As is obvious from the nature of the present invention, no criticality exists with respect to the plastic films which may be severed by means of the present apparatus. Among the more important materials are polyethylene, polyethylene terephthalate (Mylar), polypropylene, polyvinyl fluoride (Teslar), polyvinyl chloride, polyvinylidene chloride (Saran), polyvinyl chloride-acetate copolymers, polystyrene, polyamides, cellulose films such as cellophane, as well as numerous other fusible films because of the versatility of the apparatus of the present invention relative to the control of temperatures, tensions and speeds.

Various modifications may be made in the present apparatus without departing from the spirit of the present invention. For instance, where desired, roll 22 and spool 12 may be power-operated by different motors, and the speed of each may be varied with respect to the other to provide the most suitable operation depending upon the nature and thickness of the plastic film which is being cut. Likewise as many cutting wires may be simultaneously employed as may be desired in the manner shown by FIGS. 2 and 3. Also, to provide more even severing of the plastic material, it is sometimes preferable to furnish spool 11 or roll 21 or both with a braking device or friction component so that the tension on the wire and/or plastic sheet material is constant and they are maintained relatively taut.

Variations and modifications may be made within the scope of the claims and portions of the improvements may be used without others.

I claim:

1. Apparatus for severing plastic material fed therethrough in sheet form, comprising a support, supply means mounted thereon above said sheet containing a supply of electric resistance wire, receiving means mounted on said support and spaced from said supply means below said sheet to receive said wire as it is removed from said supply means and form a vertical stretch of wire extending therebetween, a portion of said stretch being adapted to form a hot wire cutter for the plastic material, means operating the supply and receiving means to continuously move the wire, spaced contacts of opposite polarity engaging said wire on opposite sides of the material as it travels therebetween, and means for connecting said contacts to a source of electrical energy to energize only the portion of wire between the contacts and heat said wire through its resistance sufficiently to cut the plastic material.

2. Apparatus for severing plastic material fed therethrough in sheet form, comprising a support, a plurality of supply means mounted thereon above said sheet containing a supply of electric resistance wire, a plurality of receiving means mounted on said support and spaced from said supply means below said sheet to receive said wire as it is removed from said supply means and form a vertical stretch of wire extending therebetween, a portion of said stretch being adapted to form a hot wire cutter for the plastic material, means operating the supply and receiving means to continuously move the wire, spaced contacts of opposite polarity engaging said wire on opposite sides of the material as it travels therebetween, and means for connecting said contacts to a source of electrical energy to energize only the portion of wire between the contacts and heat said wire through its resistance sufficiently to cut the plastic material.

3. Apparatus for severing plastic material fed therethrough in sheet form, comprising a support, supply means mounted thereon containing a supply of electric resistance wire, a plurality of idler means located on opposite sides of the plastic sheet for contacting said wire and directing its path through the plastic sheet, receiving means mounted on said support and spaced from said supply means to receive said wire as it is removed from said supply means and passed over said idler means and form a number of stretches of wire extending therebetween, a portion of each of said stretches being adapted to form a hot wire cutter for the plastic material, means operating the supply and receiving means to continuously move the wire, spaced contacts of opposite polarity engaging said stretches of wire on opposite sides of the material as it travels therebetween, and means for connecting said contacts to a source of electrical energy to energize only the portion of each stretch of wire between the contacts and heat said wire through its resistance sufficiently to cut the plastic material.

4. Apparatus for severing plastic material fed therethrough in sheet form, comprising a support, supply means mounted thereon above said sheet containing a supply of electric resistance wire, receiving means mounted on said support and spaced from said supply means below said sheet to receive said wire as it is removed from said supply means and form a vertical stretch of wire extending therebetween, a portion of said stretch being adapted to form a hot wire cutter for the plastic material, means operating the supply and receiving means to continuously move the wire, spaced contacts of opposite polarity engaging said wire on opposite sides of the material as it travels therebetween, plastic supply means adapted to contain plastic material in sheet form, plastic receiving means spaced from but associated with said plastic supply means for receiving said plastic material after it has passed between said contacts and is severed by said wire, means for moving said plastic material from said plastic supply means to said plastic receiving means, and means for connecting said contacts to a source of electrical energy to energize only the portion of wire between the contacts and heat said wire through its resistance sufficiently to cut the plastic material.

5. Apparatus for severing plastic material fed therethrough in sheet form, comprising a support, a first spool mounted thereon above said sheet and carrying wound electric resistance wire, a second spool mounted on said support and spaced from said first spool below said sheet to receive said wire as it is unwound from said first spool and form a vertical stretch of wire extending therebetween, a portion of said stretch being adapted to form a hot wire cutter for the plastic material, means operating the supply and receiving spools to continuously move the wire, spaced contacts of opposite polarity engaging said wire on opposite sides of the material as it travels therebetween, and means for connecting said contacts to a source of electrical energy to energize only the portion of wire between the contacts and heat said wire through its resistance sufficiently to cut the plastic material.

6. Apparatus for severing plastic material fed therethrough in sheet form, comprising a support, supply means mounted thereon above said sheet containing a supply of electric resistance wire, receiving means mounted on said support and spaced from said supply means below said sheet to receive said wire as it is removed from said supply means and form a vertical stretch of wire extending therebetween, a portion of said stretch being adapted to form a hot wire cutter for the plastic material, means operating the supply and receiving means to continuously move the wire, spaced contacts of opposite polarity engaging said wire on opposite sides of the material as it travels therebetween, a first roll adapted to contain plastic material in sheet form, a second roll spaced from but associated with said first roll for receiving said plastic material after it has passed between said spaced contacts and is severed by said wire, means for moving said plastic material from said first roll to said second roll, and means for connecting said contacts to a source of electrical energy to energize only the portion of wire between the contacts and heat said wire through its resistance sufficiently to cut the plastic material.

7. An apparatus as defined by claim 2 in which the plurality of supply means and the plurality of receiving means are pivotally mounted.

References Cited in the file of this patent

UNITED STATES PATENTS

| | | |
|---|---|---|
| 1,445,992 | Cameron | Feb. 20, 1923 |
| 2,526,650 | Gaibel | Oct. 24, 1950 |
| 2,629,807 | Godley | Feb. 24, 1953 |
| 2,794,110 | Griffith | May 28, 1957 |
| 2,972,669 | Brown | Feb. 21, 1961 |

FOREIGN PATENTS

| | | |
|---|---|---|
| 548,727 | Italy | Sept. 29, 1956 |
| 1,203,319 | France | July 27, 1959 |